(12) United States Patent
Schikevitz

(10) Patent No.: US 10,899,552 B1
(45) Date of Patent: Jan. 26, 2021

(54) TELESCOPING CONVEYOR INCORPORATING OPERATOR SAFETY FEATURE

(71) Applicant: Siemens Logistics LLC, DFW Airport, TX (US)

(72) Inventor: Christopher Schikevitz, Mansfield, TX (US)

(73) Assignee: Siemens Logistics LLC, DFW Airport, TX (US)

(*) Notice: Subject to any disclaimer, the term of this patent is extended or adjusted under 35 U.S.C. 154(b) by 0 days.

(21) Appl. No.: 16/863,017

(22) Filed: Apr. 30, 2020

(51) Int. Cl.
*B65G 43/02* (2006.01)
*B65G 21/14* (2006.01)

(52) U.S. Cl.
CPC ............ *B65G 43/02* (2013.01); *B65G 21/14* (2013.01); *B65G 2203/0283* (2013.01); *B65G 2203/042* (2013.01); *B65G 2207/40* (2013.01)

(58) Field of Classification Search
CPC ...... B65G 15/26; B65G 21/14; B65G 41/003; B65G 41/005; B65G 43/02; B65G 2203/0283; B65G 2203/042; B65G 2207/40
See application file for complete search history.

(56) References Cited

U.S. PATENT DOCUMENTS

| | | | |
|---|---|---|---|
| 5,351,809 A | 10/1994 | Gilmore et al. | |
| 6,484,862 B1* | 11/2002 | Gilmore | B65G 21/14 193/35 TE |
| 7,108,125 B2* | 9/2006 | Gilmore | A61K 9/0019 198/313 |
| 7,168,555 B2 | 1/2007 | Peterson | |
| 7,370,753 B2* | 5/2008 | Yang | B65G 21/14 193/35 TE |
| 8,496,104 B2* | 7/2013 | Yang | B65G 21/14 198/812 |
| 9,045,289 B2* | 6/2015 | Carpenter | B65G 43/02 |
| 9,315,328 B2* | 4/2016 | Baek, IV | B65G 21/14 |

* cited by examiner

*Primary Examiner* — Gene O Crawford
*Assistant Examiner* — Keith R Campbell

(57) ABSTRACT

A telescoping conveyor includes a base section and one or more boom sections mounted on the base section and operable to be telescopically extended and retracted in relation to the base section. Control switches are located at multiple locations to enable operator control to extend or retract the one or more boom sections. The telescoping conveyor is configured such that, during a retraction operation, when a predefined degree of retraction is reached, a change in operator control is imposed to enable an operator to continue retraction of the one or more boom sections. The changed operator control requires the operator to be positioned away from a location of a potential hazard during the continued retraction operation.

20 Claims, 4 Drawing Sheets

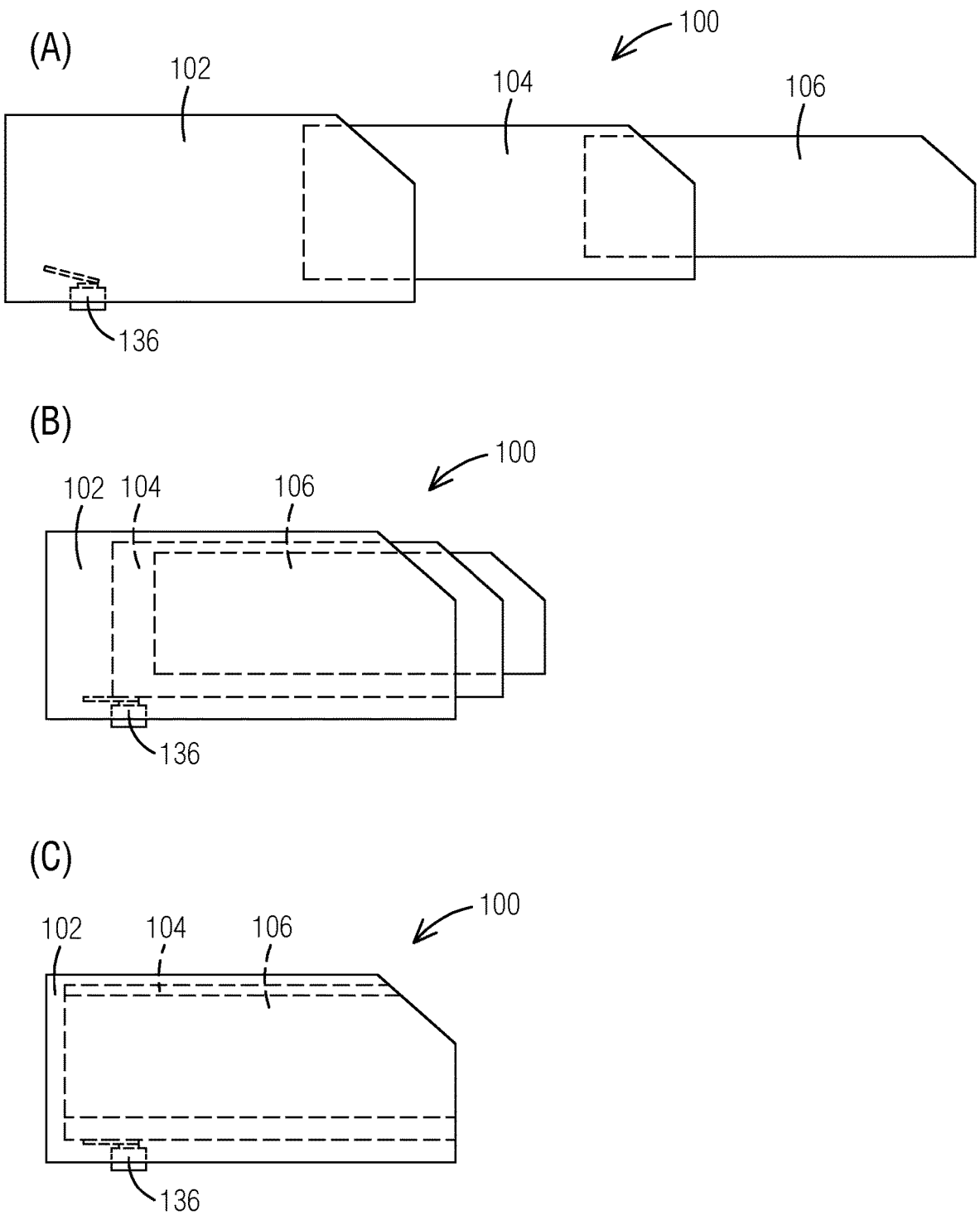

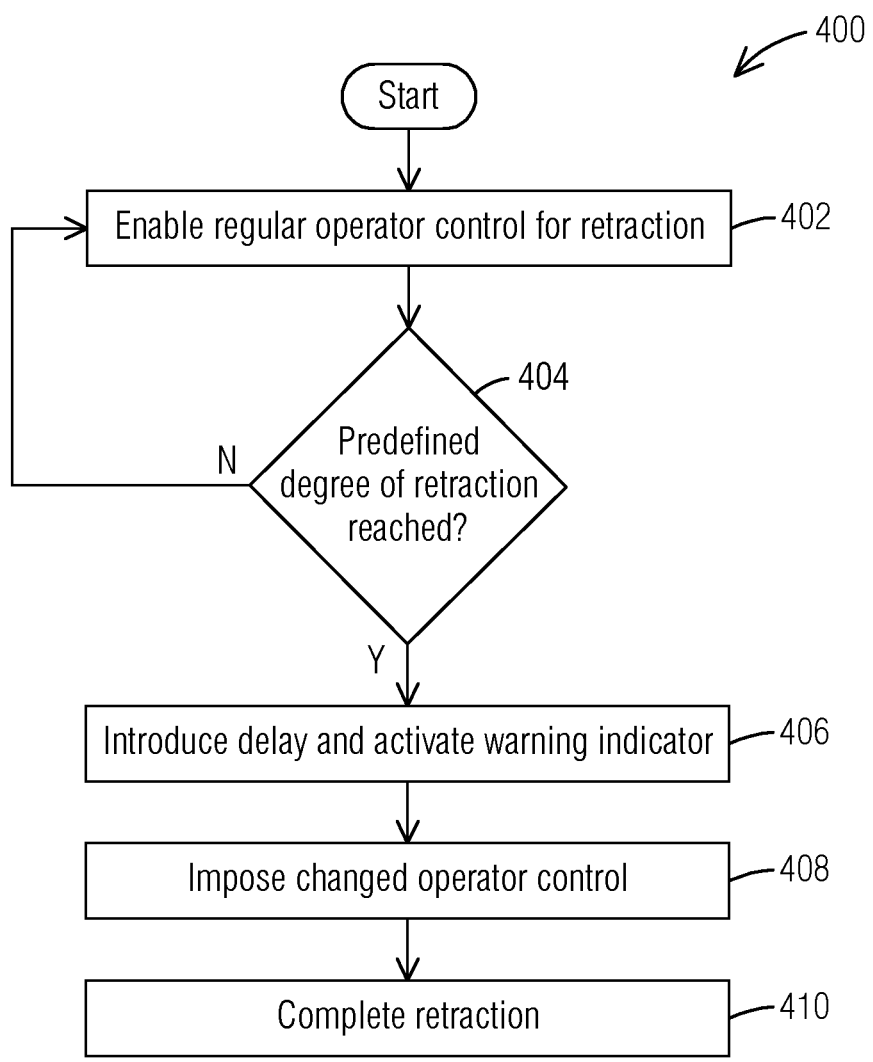

TELESCOPING CONVEYOR INCORPORATING OPERATOR SAFETY FEATURE

TECHNICAL FIELD

The present disclosure relates generally to extendable conveyors, also referred to as telescoping conveyors, and in particular, to a technique for providing an operator safety feature in a telescoping conveyor.

BACKGROUND

A telescoping belt conveyor typically includes a stationary base section which houses one or more extendable conveyor sections, referred to as boom sections. The boom sections may be telescopically extended and retracted in relation to the base section via a suitable system of drive members, such as drive chains. The base section typically houses a drive system for actuating the telescopic movement of the boom sections.

Depending on their design, telescoping conveyors may pose a risk that an operator may potentially get their hands or fingers squeezed between the boom sections during the telescopic movement.

SUMMARY

Briefly, aspects of the present disclosure are directed to an improved technique for providing an operator safety feature in a telescoping conveyor, particularly during a retraction operation of the telescoping conveyor.

According to a first aspect of the disclosure, a telescoping conveyor is provided. The telescoping conveyor comprises a base section and one or more boom sections mounted on the base section and operable to be telescopically extended and retracted in relation to the base section. The telescoping conveyor further comprises control switches located at multiple locations to enable operator control to extend or retract the one or more boom sections. The telescoping conveyor is configured such that, during a retraction operation, when a predefined degree of retraction is reached, a change in operator control is imposed to enable an operator to continue retraction of the one or more boom sections. The changed operator control requires the operator to be positioned away from a location of a potential hazard during the continued retraction operation.

According to a second aspect of the disclosure, a method is provided for operating a telescoping conveyor comprising a base section and one or more boom sections mounted on the base section. The method comprises enabling operator control to extend or retract the one or more boom sections via control switches located at multiple locations. During a retraction operation, when a predefined degree of retraction is reached, the method comprises imposing a change in operator control to enable an operator to continue retraction of the one or more boom sections. The changed operator control requires the operator to be positioned away from a location of a potential hazard during the continued retraction operation.

Additional technical features and benefits may be realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The foregoing and other aspects of the present disclosure are best understood from the following detailed description when read in connection with the accompanying drawings, in which:

FIG. 3 is a schematic diagram illustrating an alternate embodiment for incorporating an operator safety feature in a telescoping conveyor; and FIG. 4 is a flowchart illustrating a method for controlling a telescoping conveyor according to an aspect of the present disclosure.

DETAILED DESCRIPTION

In some configurations, a telescoping conveyor includes drive members, such as chains, for implementing the telescopic movements of the boom sections. Each section, including the base section and each boom section mounts at least one chain for the purpose of controlling the extension and retraction of the next (outward) section. In the base section, this chain is driven by a motor. At each boom section, the chain mounting points that connect the respective boom section to the chain in the previous (inward) section require a gap that runs underneath the entire length of each of the boom sections to be able to operate. During the final retracting distance, the exposed gap is reduced to the point of there being essentially no exposed gap. Depending on the design, in this final retracting distance, a shearing or crushing hazard may exist, which could potentially cause operator injury.

Aspects of the present disclosure are directed to a telescoping conveyor incorporating an improved operator safety feature, particularly during a retraction operation of the telescoping conveyor, where a possibility of a shear hazard exists at certain pinch points.

Figure 1:
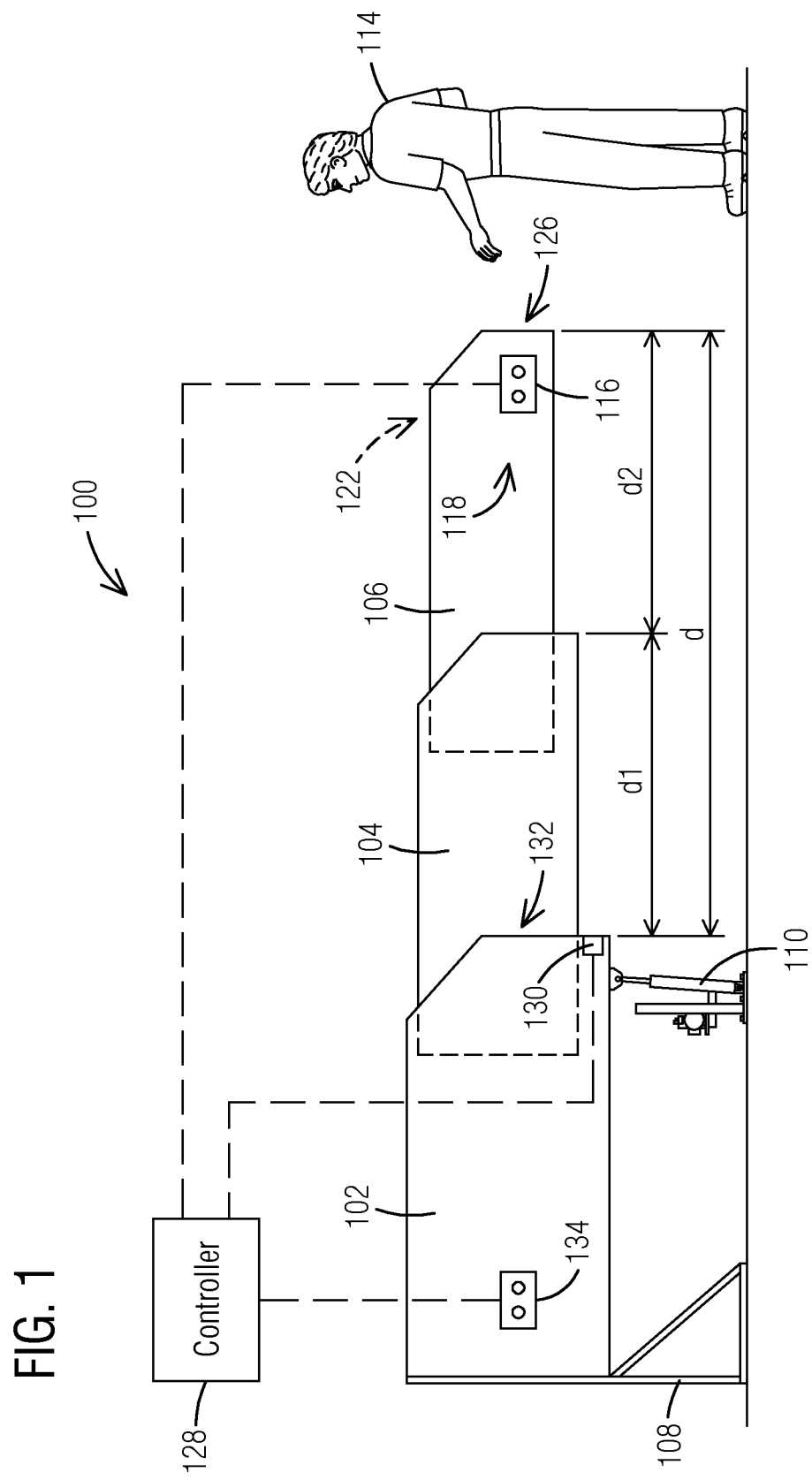
FIG. 1 is a schematic diagram illustrating a telescoping conveyor incorporating an operator safety feature in accordance with an example embodiment.

Referring now to the drawings, FIG. 1 shows a telescoping conveyor 100 in accordance with an illustrative embodiment. The telescoping conveyor 100 comprises a stationary base section 102 and one or more extendable conveyor sections 104, 106, mounted on the base section 102. The extendable conveyor sections are referred to in this description as "boom sections." The boom sections 104, 106 are configured to be moved in and out in relation to each other and the base section 102, whereby they extend or retract telescopically in relation to the base section 102.

FIG. 1 is a side elevation view showing an extended state of the telescoping conveyor 100. In the illustrative example, two boom sections are shown, namely an outermost boom section 106 and an intermediate boom section 104. An outermost boom section is defined as one that extends the furthest in relation to the base section 102 in an extended state of the telescoping conveyor 100. In case of a telescoping conveyor with a single boom section, the outermost boom section is understood to refer to that single boom section. In an extended state, the one or more boom sections 104, 106 are cantilever supported by the base section 102. In a completely retracted state of the telescoping conveyor 100, each of the boom sections 104, 106 is housed within the base section 102.

The stationary base section 102 may be supported by rear support 108 and an adjustable forward support 110. Each of the base section 102 and the boom sections 104, 106 includes an upper surface to support a conveying member, such as a conveyor belt 112 (see FIG. 2). The conveyor belt 112 may be driven by a drive motor and drive roll (not shown), and may be arranged such that the belt 112 is under proper tension irrespective of the extended length of the telescoping conveyor 100, as is well known in the art.

The telescoping conveyor 100 may be used, for example, for loading and unloading a container truck, among other applications. For this operation, the base section 102 housing the boom sections 104, 106 may be positioned near the door of a loading/unloading dock (not shown). Thereafter, the telescoping conveyor 100 may be operated by an operator 114 to extend the boom sections 104, 106 through the dock door. Upon completion of the loading/unloading process, the telescoping conveyor 100 may be operated by the operator 114 to retract the boom sections 104, 106 into the base section 102.

Figure 2:
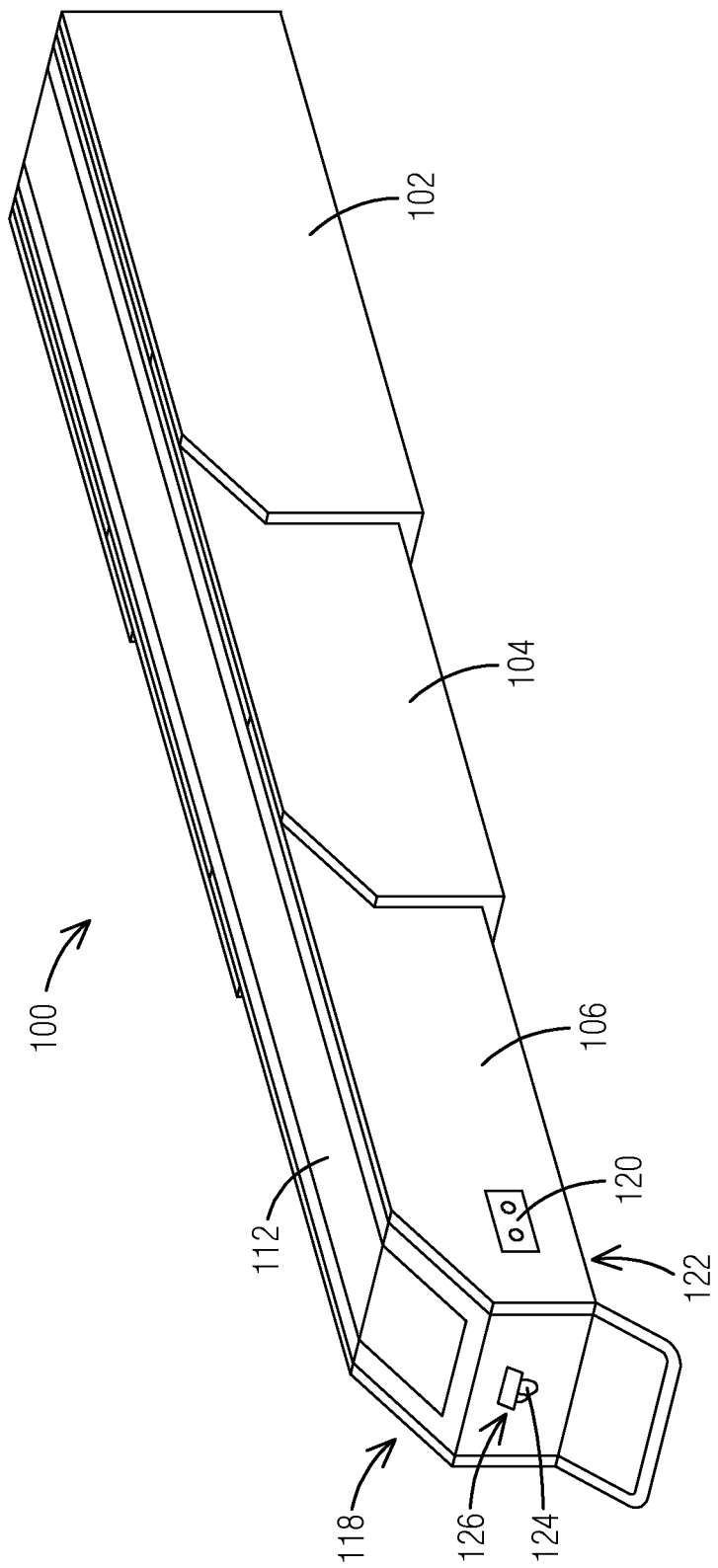
FIG. 2 is a perspective view of the telescoping conveyor.

To enable operator control to extend and retract the boom sections 104, 106, control switches are provided, which may be located at multiple locations, typically including at least one location on the outermost boom section 106. For example, a first extension/retraction control switch or switches 116 may be located on a first side 118 of the outermost boom section 106. A second extension/retraction control switch or switches 120 (visible in FIG. 2) may be located on a second side 122 of the outermost boom section 106, opposite to the first side 118. Providing extension and retraction controls on both sides of the outermost boom section may conveniently allow the operator 114 to work and control the telescoping conveyor 100 from either side, thereby improving productivity. Furthermore, as shown in FIG. 2, controls 124 may be provided at a forward end 126 of the outermost boom section 106. Such controls 124 may include, for example, controls for activating the conveyor belt 112, adjusting the speed and direction of the conveyor belt 112, etc. In certain embodiments, as described in further detail below, one or more control switches 134 may be provided at a location distant from the boom sections 104, 106, such as at the base section 102.

According to an aspect of the present disclosure, the telescoping conveyor 100 is configured such that, during a retraction operation, when a predefined degree of retraction is reached, a change in operator control is imposed to enable an operator 114 to continue retraction of the one or more boom sections 104, 106. The changed operator control requires the operator 114 to be positioned away from a location of a potential hazard during the continued retraction operation. The term "operator control," as used in this description, refers to a method implemented by an operator by way of operating one or more of the control switches (which are located in multiple locations), to carry out a given operation of the telescoping conveyor, such as a retracting operation in this case.

In the embodiment shown in FIG. 1, the telescoping conveyor 100 includes a controller 128, which is configured for digitally controlling the telescopic movements of the boom sections 104, 106, among other functions such as starting and stopping the conveyor belt 112, etc. The controller 128 may comprise, for example, a programmable logic controller (PLC), or any other digital controller capable of executing the described functions. Notwithstanding the schematic depiction in FIG. 1, it will be appreciated that the controller 128 may be physically located either within or outside the base section 102, or even at a remote location from the telescoping conveyor 100. During the retraction operation, the controller 128 may monitor a range of inputs, for example, including a measurement indicative of an overhang length from a sensor 130, input from control switches such as control switches 116, 120 on the outermost boom section 106, and in some embodiments, one or more control switches 134 at the base section 102.

Specifically, in this embodiment, the controller 128 is configured to control a retraction operation of the telescoping conveyor 100 in a manner that ensures operator safety during the retraction operation. During the retraction operation, the controller 128 monitors an overhang length of the boom sections 104, 106, which decreases as the retraction operation progresses, and imposes the changed operator control when the overhang length reaches a specified range that is indicative of the predefined degree of retraction being reached. The overhang length of a boom section 104 or 106 is defined as the length of the portion of the boom section that overhangs from the previous (inner) section 102 or 104 respectively. The overhang lengths of the boom sections 104 and 106 are denoted respectively as d1 and d2 in FIG. 1.

During the telescopic movements, each of the boom sections 104, 106 extends or retracts the same distance. Thus, the overhang lengths d1, d2 of the boom sections 104, 106 are nearly equal at any point during the telescopic movements. The specified range, during which the changed operator control is imposed by the controller 128, may correspond to a final stage of the retraction operation before a complete retraction of the telescoping conveyor 100. As a non-limiting illustrative example, the specified range may be 0 to 200 millimeters for either of the overhang lengths d1, d2 of the respective boom sections 104, 106.

Since a hazard may exist underneath each of the boom sections 104, 106 at a certain stage in the retraction operation, such a hazard would be located at nearly the same distance for every overhang. Hence, there is a point in time during the retraction operation when all of the boom sections 104, 106 will have the same potential hazard. The illustrative example shown in FIG. 1 leverages this aspect to determine a potential hazard by measuring a single distance d, which is the overall extension of the outermost boom section 106 in relation to the base section 102, to impose a change in operator control to avoid potential operator injury. Since the overall extension d is the sum of the individual overhang lengths d1, d2, and the individual overhang lengths are nearly equal, the measurement of the overall extension d is effectively indicative of the individual overhang lengths d1, d2. That is, the individual overhang lengths d1, d2 may be inferred from the overall extension d.

The telescoping conveyor 100 may be provided with a sensor 130, for example, a laser sensor, among others, to obtain a measurement indicative of the overhang length and communicate the measurement to the controller 128. In the present example, the overhang length is inferred by measuring the overall extension d of the outermost boom section 106 in relation to the base section 102. The overall extension d may be measured as a distance from a forward end 132 of the base section 102 to a forward end 126 of the outermost boom section 106. The sensor 130 may be located at the forward end 132 of the base section 102 (as shown), or at the forward end 126 of the outermost boom section 106, or at any other suitable location.

In an alternate approach, the measurement of an overhang length may be avoided altogether. FIG. 3 schematically shows an illustrative embodiment of the alternate approach. In this embodiment, a switch 136 is employed to indicate when a predefined degree of retraction is reached. Specifically, the switch 136 may be configured to be actuated by a movement of a boom section 104 into the base section 102 when the predefined degree of retraction is reached.

Referring to FIG. 3, the operational state A corresponds to an extended state of the telescoping conveyor 100, the operational state B corresponds to a partially retracted state of the telescoping conveyor 100 when a predefined degree of retraction is just reached and the operational state C corresponds to a completely retracted state of the telescoping conveyor 100. In this embodiment, similar to the embodiment of FIG. 1, control switches (e.g., 116, 120, 134, etc.) may located at multiple locations to enable operator control to extend or retract the one or more boom sections 104, 106. These control switches are not shown in FIG. 3 for the sake of clarity. It will be appreciated that the embodiment shown in FIG. 3 may be implemented with or without a controller such as that shown in FIG. 1.

In the operational state A, switch 136 is in a first state. At this time, a regular operator control for retraction is enabled, such as that described in greater detail below. As the telescoping conveyor 100 reaches operational state B, the switch 136 is actuated, i.e., changes to a second state. The actuation of the switch 136 may consequently trigger the telescoping conveyor 100 to impose a changed operator control, such as that described in greater detail below, to continue further retraction into state C. The switch 136 is positioned such that it is actuated (i.e., changes state) by the movement of one of the boom sections, in this case, the innermost boom section 104, into the base section 102. In the embodiment shown in FIG. 3, the switch 136 is disposed in the base section 102. Specifically, the switch 136 is positioned at an appropriate location along the length of the base section 102, such that it is directly physically actuated by the boom section 104 when the predefined degree of retraction is reached. In other embodiments, the switch may be disposed elsewhere, for example, on the boom section 104.

Referring now generally to the embodiments described in FIG. 1-3, the control switches provided at multiple locations may include at least retraction control switch located on the outermost boom section 106.

In a first variation, a first retraction control switch 116 is located on a first side 118 of the outermost boom section 106 and a second retraction control switch 120 is located on a second side 122 of the outermost boom section 106 opposite to the first side 118. During the retraction operation, a parallel connection of the switches 116 and 120 may be enabled, thereby enabling regular operator control via operating either one of the retraction control switches 116 and 120 to retract the telescoping conveyor 100 before the predefined degree of retraction is reached. The operator 114 is able to operate the telescoping conveyor 100 to retract up to this point standing on either side of the outermost boom section 106, thereby improving productivity. Once the predefined degree of retraction is reached, a series connection of the control switches 116 and 120 may be enabled. This imposes a changed operator control which requires the operator 114 to operate both the retraction control switches 116 and 120 simultaneously to continue the retraction operation till the boom sections 104, 106 retract completely into the base section 102. The changed operator control requires the operator 114 to essentially stand in front of the outermost boom section 106, thereby ensuring that the operator 114 keeps both hands and body out of the gap underneath the boom sections 106, 104 where a potential hazard now exists.

In a second variation, the control switches may include a retraction control switch 134 located at a distance from the boom sections 104, 106, such as at the base section 102 (accessible from outside), in addition to the at least one retraction control switch 116/120 located on the outermost boom section 106. During the retraction operation, regular operator control may be enabled via operating the at least one retraction control switch 116/120 to retract the telescoping conveyor 100 before the predefined degree of retraction is reached. At this point, the retraction control switch 134 at the base section 102 may or may not be enabled. The operator 114 is able to operate the telescoping conveyor 100 to retract up to this point standing next to the outermost boom section 106. Once the predefined degree of retraction is reached, any control switch 116/120 located on the outermost boom section 106 may be disabled, while enabling or continuing to enable only the control switch 134 located on the base section 102. This imposes a changed operator control which requires the operator 114 to operate the retraction control switch 134 to continue the retraction operation till the boom sections 104, 106 retract completely into the base section 102. This ensures that the operator 114 is positioned safely at a fair distance from the location underneath the boom sections 106, 104 where a potential hazard now exists.

In a further embodiment, as an additional measure to the above described embodiments, the telescoping conveyor 100 may be configured (via controller 128 or otherwise) to introduce a delay between a control request to retract further once the predefined degree of retraction is reached. During the delay, an audible and/or visual warning indicator may be activated, to notify the operator 114 of the changed operator control about to be imposed.

FIG. 4 illustrates an exemplary method 400 for operating a telescoping conveyor according to an aspect of the present disclosure. Operational blocks of the method 400 may be executed, though not necessarily, by a controller as described above. The operational blocks described herein relate specifically to a retraction operation of the telescoping conveyor. At the time of commencement of the method 400, the telescoping conveyor is understood to be in an extended state, i.e., in a fully extended state or at least in a state where a predefined degree of retraction has not been reached. FIG. 4 is not intended to indicate that the operational blocks of the method 400 are to be executed in any particular order, or that all of the blocks of the method 400 are to be included in every case. Additionally, the method 400 can include any suitable number of additional operations.

Block 402 of the method 400 involves enabling regular operator control for retraction. In a first variation wherein first and second retraction control switches are provided on either side of the outermost boom section, block 402 may involve enabling a parallel connection of the first and second retraction control switches. This enables an operator to control retraction of the telescoping conveyor from either side by operating either of the first or second retraction control switches. In a second variation wherein a retraction control switch is provided at the base section (or any other location distant from boom sections), in addition to at least one retraction control switch located on the outermost boom section, block 402 may involve enabling the at least one retraction control switch located on the outermost boom section. This enables an operator to control retraction of the telescoping conveyor standing next to the outermost boom section.

At block 404, if a predefined degree of retraction is not reached, the operational block 402 continues to be executed by enabling regular operator control for retraction. If, at block 404, a predefined degree of retraction is reached, the operation proceeds to the subsequent operational blocks to impose a change in operator control. In one approach, an overhang length of a boom section of the one or more boom sections may be monitored during the retraction operation. In this case, the predefined degree of retraction may be determined to be reached when the overhang length reaches a specified range. In an alternate approach, the measurement of an overhang length may be avoided by employing a switch to indicate when a predefined degree of retraction is reached. The switch may be located, for example, inside the base section and may be configured to be actuated by a movement of a boom section into the base section during the retraction operation.

Block 406 of the method 400 involves introducing a delay between a control request to retract further once the predefined degree of retraction is reached, and activating an audible and/or visual warning indicator during the delay. In some embodiments, the operational block 406 may be omitted.

Block 408 of the method 400 involves imposing a change in operator control to enable the operator to continue retraction of the telescoping conveyor. In the above-mentioned first variation, block 408 may involve enabling a series connection of the first and second retraction control switches located on either side of the outermost boom section. The imposed change in operator control requires the operator to operate both the first and second retraction control switches simultaneously to continue the retraction operation, thereby positioning the operator in front of the outermost boom section, and away from a potential hazard underneath the boom sections. In the above-mentioned second variation, block 408 may involve disabling any retraction control switch at the outermost boom section and enabling the retraction control switch at the base section. The imposed change in operator control requires the operator to operate the retraction control switch at the base section to continue the retraction operation, thereby positioning the operator at a safe distance from a potential hazard underneath the boom sections.

Block 410 of the method 400 involves continuing the retraction operation via the changed operator control until the boom sections retract completely into the base section of the telescoping conveyor.

The system and processes of the figures are not exclusive. Other systems and processes may be derived in accordance with the principles of the disclosure to accomplish the same objectives. Although this disclosure has been described with reference to particular embodiments, it is to be understood that the embodiments and variations shown and described herein are for illustration purposes only. Modifications to the current design may be implemented by those skilled in the art, without departing from the scope of the disclosure.

What is claimed is:

1. A telescoping conveyor comprising:
   a base section,
   one or more boom sections mounted on the base section and operable to be telescopically extended and retracted in relation to base section, and
   control switches located at multiple locations to enable operator control to extend or retract the one or more boom sections,
   wherein the telescoping conveyor is configured such that, during a retraction operation, when a predefined degree of retraction is reached, a change in operator control is imposed to enable an operator to continue retraction of the one or more boom sections, the changed operator control requiring the operator to be positioned away from a location of a potential hazard during the continued retraction operation.

2. The telescoping conveyor of claim 1, comprising a controller configured to monitor an overhang length of a boom section of the one or more boom sections during the retraction operation, and impose the changed operator control when the overhang length reaches a specified range that is indicative of the predefined degree of retraction being reached.

3. The telescoping conveyor of claim 2, wherein the controller is configured to receive, from a sensor, a measurement indicative of the overhang length.

4. The telescoping conveyor of claim 3, wherein the measurement comprises a measurement of an overall extension of an outermost boom section, of the one or more boom sections, from the base section.

5. The telescoping conveyor of claim 1, comprising a switch configured to be actuated by a movement of a boom section of the one or more boom sections into the base section when the predefined degree of retraction is reached, wherein the telescoping conveyor is configured to impose the change in operator control consequent to the actuation of the switch.

6. The telescoping conveyor of claim 1, wherein the control switches include at least one retraction control switch located on an outermost boom section of the one or more boom sections.

7. The telescoping conveyor of claim 6,
   wherein the control switches include first and second retraction control switches located respectively on first and second opposite sides of the outermost boom section, and
   wherein the changed operator control requires the operator to operate both the first and second retraction control switches to continue the retraction operation.

8. The telescoping conveyor of claim 7, wherein the telescoping conveyor is configured to enable operator control via operating either one of the first and second retraction control switches to retract the telescoping conveyor before the predefined degree of retraction is reached.

9. The telescoping conveyor of claim 6,
   wherein the control switches include a further retraction control switch located at a distance from the one or more boom sections, and
   wherein the changed operator control requires the operator to operate the further retraction control switch to continue the retraction operation.

10. The telescoping conveyor of claim 9, wherein the further retraction control switch is located at the base section.

11. The telescoping conveyor of claim 1, wherein the telescoping conveyor is configured to introduce a delay between a control request to retract further once the predefined degree of retraction is reached, and to activate an audible and/or visual warning indicator during the delay.

12. A method for operating a telescoping conveyor comprising a base section and one or more boom sections mounted on the base section, the method comprising:
   enabling operator control to extend or retract the one or more boom sections via control switches located at multiple locations,
   wherein, during a retraction operation, when a predefined degree of retraction is reached, the method comprises imposing a change in operator control to enable an operator to continue retraction of the one or more boom sections, the changed operator control requiring the operator to be positioned away from a location of a potential hazard during the continued retraction operation.

13. The method of claim 12, comprising monitoring an overhang length of a boom section of the one or more boom sections during the retraction operation, and imposing the changed operator control when the overhang length reaches a specified range that is indicative of the predefined degree of retraction being reached.

14. The method of claim 13, comprising measuring an overall extension of an outermost boom section, of the one or more boom sections, from the base section, wherein the measurement of the overall extension is indicative of the overhang length.

15. The method of claim 12, wherein the change in operator control is imposed consequent to an actuation of a switch, the switch being configured to be actuated by a movement of a boom section of the one or more boom sections into the base section when the predefined degree of retraction is reached.

16. The method of claim 12, wherein the control switches include at least one retraction control switch located on an outermost boom section of the one or more boom sections.

17. The method of claim 16, wherein the control switches include first and second retraction control switches located respectively on first and second opposite sides of the outermost boom section, and wherein the changed operator control requires the operator to operate both the first and second retraction control switches to continue the retraction operation.

18. The method of claim 17, comprising enabling operator control via operating either one of the first and second retraction control switches to retract the telescoping conveyor before the predefined degree of retraction is reached.

19. The method of claim 16, wherein the control switches include a further retraction control switch located at a distance from the one or more boom sections, and wherein the changed operator control requires the operator to operate the further retraction control switch to continue the retraction operation.

20. The method of claim 12, comprising:

introducing a delay between a control request to retract further once the predefined degree of retraction is reached, and activating an audible and/or visual warning indicator during the delay.

* * * * *